(12) United States Patent
Schaack et al.

(10) Patent No.: US 12,714,942 B2
(45) Date of Patent: Aug. 25, 2026

(54) DEVICE FOR TRANSPORT BY MOTORIZED ZIPWIRE, AND ASSOCIATED TRANSPORT ASSEMBLY AND METHOD

(71) Applicant: Pole d' Activites Sportives Culturelles et Touristiques, Porté-Puymorens (FR)

(72) Inventors: Floran Schaack, Porté-Puymorens (FR); Guillaume Carre, Bully (FR); Baptiste Joel Michel Allo, Bourgoin Jallieu (FR); Bruno Sellier, Fontenay sous bois (FR)

(73) Assignee: Pole d' Activities Sportives Culturelles et Touristiques, Porté-Puymorens (FR)

( * ) Notice: Subject to any disclaimer, the term of this patent is extended or adjusted under 35 U.S.C. 154(b) by 272 days.

(21) Appl. No.: 18/568,485

(22) PCT Filed: Jun. 8, 2022

(86) PCT No.: PCT/FR2022/051094
§ 371 (c)(1),
(2) Date: Dec. 8, 2023

(87) PCT Pub. No.: WO2022/258929
PCT Pub. Date: Dec. 15, 2022

(65) Prior Publication Data

US 2025/0121295 A1 Apr. 17, 2025

(30) Foreign Application Priority Data

Jun. 8, 2021 (FR) ...................................... 2106036

(51) Int. Cl.
*A63G 21/22* (2006.01)
*B61B 7/06* (2006.01)
(Continued)

(52) U.S. Cl.
CPC ................ *A63G 21/22* (2013.01); *B61B 7/06* (2013.01); *B61C 17/06* (2013.01); *H02J 7/14* (2013.01)

(58) Field of Classification Search
CPC ............ A63G 21/22; B61B 7/06; B61C 17/06
(Continued)

(56) References Cited

U.S. PATENT DOCUMENTS 5,920,226 A 7/1999 Mimura

FOREIGN PATENT DOCUMENTS

JP 2020082788 A 6/2020
KR 20170104074 A 9/2017
(Continued)

*Primary Examiner* — Troy Chambers
(74) *Attorney, Agent, or Firm* — Nath, Goldberg & Meyer; Joshua B. Goldberg

(57) ABSTRACT

The invention relates to a transport device (I) for transporting a load from a first altitude to a second altitude that is lower than the first altitude while being attached to a guide line (5) and descending along the latter by gravity, comprising: an electric motor (8) for raising the transport device from the second altitude to the first altitude along the line, a first battery (9) for powering the motor, and an electric generator comprising a rotating part and designed to recharge the first battery when the rotating part is caused to rotate under the effect of the descent of the transport device from the first altitude to the second altitude The invention is particularly adapted to zipwire transport.

29 Claims, 5 Drawing Sheets

(51) Int. Cl.
*B61C 17/06* (2006.01)
*H02J 7/14* (2006.01)

(58) Field of Classification Search
USPC .......................................................... 104/115
See application file for complete search history.

(56) References Cited

FOREIGN PATENT DOCUMENTS

| | | | | | |
|---|---|---|---|---|---|
| KR | 101885844 | B1 | * 8/2018 | ............. | B61B 12/00 |
| KR | 102044911 | B1 | * 12/2019 | ............... | B61B 7/00 |
| KR | 102171339 | B1 | * 11/2020 | ............. | A63G 21/22 |
| KR | 20210049249 | A | * 5/2021 | ............. | B61B 12/04 |
| WO | WO-2009143529 | A2 | * 11/2009 | ............. | B61B 12/02 |

* cited by examiner

DEVICE FOR TRANSPORT BY MOTORIZED ZIPWIRE, AND ASSOCIATED TRANSPORT ASSEMBLY AND METHOD

This is a National Phase Application filed under 35 U.S.C. 371 as a national stage of PCT/FR2022/051094, filed Jun. 8, 2022, an application claiming the benefit of French Application No. 2106036, filed Jun. 8, 2021, the content of each of which is hereby incorporated by reference in its entirety.

TECHNICAL FIELD

The present invention relates to the general field of transport, and more specifically to devices for transporting people or products from a high point to a low point, for example based on the principle of zipwire transportation.

More particularly, the invention relates to a transport device for transporting a load from a first altitude to a second altitude lower than the first altitude by being hooked to a guide line and descending along the latter by gravity.

The invention further relates to a transport assembly including such a transport device as well as a guide line.

The invention also relates to a transport method comprising a step of transporting a load from a first altitude to a second altitude lower than the first altitude by a transport device, during which the transport device is hooked to a guide line and descends along the latter by gravity,

PRIOR ART

In the transportation field, and more specifically recreational transportation, zipwire installations are particularly known, generally installed within acrobatic recreational parks in height or in recreational areas. Zipwire installations are ludic devices enabling a user to descend by gravity along a cable positioned at a given height with respect to the ground. The user is suspended under the cable by a harness, itself hooked to a carriage (or a single pulley) rolling on the cable. The cable itself is stretched between a high point and a low point, and the carriage therefore descends during the ludic activity from the high point to the low point. The flexible cable may be replaced by a rail or a rigid tube, but the principle remains the same.

The different zipwire installations have cable lengths, and therefore of a ludic paths, which are very variable. Some zipwires measure about ten meters, whereas others may measure several hundred. For very short zipwire lines, it is known to use a second cable, or return line, running along the first cable, and which allows lifting the carriage when it is at the low point, simply by pulling on the second cable from the high point, until the carriage reaches the high point again. This allows placing the carriage in position in order to restart the ludic descent activity of the carriage, to which another user is then suspended.

Moreover, in order to proceed with lifting of the carriage from the low point to the high point, it is also known to simply unhook the carriage (generally with several other similar carriages) off the cable when it is at the low point, and to lift it up to the high point, for example using a car or a pickup truck.

Although these systems for lifting known zipwire carriages generally fulfil their functions, they are not, however, fully satisfactory, and have some drawbacks.

Thus, the principle of the return lines is, for example, adapted only to some very short zipwires, where the user generally returns the carriage himself by pulling on the second cable. For the longer zipwires (starting from a few tens of meters), the return lines are therefore not suitable. Indeed, lifting each carriage along the first rope would take too much time, would require a substantial effort as well as winding of the long second rope, and would prevent the use of the zipwire for a substantial duration (a user being unable to descend during lifting of the carriage in the high position). In addition, the return lines are excluded for more complex zipwires, such as turn-by-turn zipwires.

Moreover, in particular for longer zipwires, having to unhook several carriages from the cable when they are at the low point, then lift them to the high point, in order then to hook them to the cable, generally turns out to be long, tedious, complex, and source of errors, deterioration of the equipment or even accidents of person. This also requires a specialized person to be involved for a long period of time, and generally requires the use of a vehicle as well as a substantial number of carriages (the lift not being interesting for only a few carriages), all the foregoing resulting in relatively high operating costs.

Finally, the systems and methods for reassembling known zipwires carriages prove to be long, inconvenient, expensive, and constraining to carry out, while having a level of safety that is not optimum.

In addition, known zipwire transport systems do not allow controlling the speed of descent in a fine and controlled manner, with at best a braking factor proportional to the speed. On these known systems, the conditions of descent (and primarily the speed) are very sensitive to external parameters (wind, drag of the user), so that it is impossible to keep the speed within a determined range.

Another problem that could be encountered with known zipwire transport systems is that of possible untimely stops, during descent, before reaching the arrival point. Such untimely stops could occur, for example, in the event of headwind and/or excessive drag, in particular if the rope has a zero slope point at the current portion.

DISCLOSURE OF THE INVENTION

Consequently, the objects assigned to the present invention aim to overcome the different drawbacks listed before and to provide a new transport device which, while being particularly reliable, has a high practicality of use and could in particular be easily lifted quickly and at low cost from a low altitude to a high altitude, with an excellent energy balance.

Another object of the invention aims to propose a new transport device that is particularly energy-efficient and effort-saving.

Another object of the invention aims to provide a new transport device, the design of which ensures implementation thereof under optimum safety conditions for a transported object or person.

Another object of the invention is to provide a new transport device the design and the principle of use of which enable it to be easily installed on a guide line, without requiring complex and frequent operations of hooking or unhooking the guide line.

Another object of the invention aims to provide a new lightweight and compact transport device.

Another object of the invention aims to provide a new transport device which implements only a reduced number of distinct parts and the installation of which is rapid and requires only a standard minimum tooling.

Another object of the invention aims to provide a new transport device, the design of which ensures a limited manufacturing cost.

Another object of the invention aims to provide a new transport device, the maintenance of which is reduced, simple, fast, and at controlled costs.

Another object of the invention is to provide a new transport device, the design of which allows controlling, efficiently and accurately, the descent speed, by overcoming external conditions (wind or other), and thus improve the user experience and safety by avoiding in particular an excessive speed on arrival.

Another object of the invention aims to provide a new transport set, the design of which ensures easy, rapid, and economical implementation, under optimum safety conditions.

Another object of the invention aims to provide a new transport method which is easy, fast, safe and economical, while having an excellent energy balance.

The objects assigned to the invention are achieved by means of a transport device for transporting a load from a first altitude to a second altitude lower than the first altitude by being hooked to a guide line and descending along the latter by gravity, said transport device being characterized in that it comprises:

an electric motor, designed so as to at least lift the transport device from the second altitude to the first altitude, along said guide line, a first battery, designed so as to power said electric motor, an electric generator comprising a rotating portion, said electric generator being designed so as to recharge said first battery when said rotating portion is rotated under the effect of the descent of the transport device from the first altitude to the second altitude, an electronic management means, configured on the one hand to detect a charge level of said first battery, and, on the other hand, to cause an emission of a leakage current by said first battery when said electronic management means detects that the charge level of said first battery exceeds a predetermined charging threshold value, at least one current receiving means, designed so as to absorb said leakage current originating from said first battery.

The objects assigned to the invention are also achieved by means of a transport assembly comprising, on the one hand, a guide line and, on the other hand, a transport device for transporting a load from a first altitude to a second altitude lower than the first altitude by being hooked to said guide line and descending along the latter by gravity, said transport device being in accordance with that of the invention described hereinabove.

The objects assigned to the invention are also achieved using a transport method comprising a step of transporting a load from a first altitude to a second altitude lower than the first altitude by a transport device, during which the transport device is hooked to a guide line and descends along the latter by gravity, the method being characterized in that it further comprises at least:

a step of generating electricity, during which a rotating portion of an electric generator of the transport device is rotated under the effect of the descent of the transport device from the first altitude to the second altitude, a step of recharging a first battery of the transport device thanks to the electricity generated during said generation step, a step of lifting the transport device from the second altitude to the first altitude, along said guide line, by means of an electric motor powered at least by said first battery, a detection step, during which it is detected that a charge level of said first battery exceeds a predetermined charging threshold value, a step of emitting, by said first battery, a leakage current, a step of absorbing, by a current reception means, said leakage current originating from said first battery.

BRIEF DESCRIPTION OF THE DRAWINGS

Other particularities and advantages of the invention will become apparent and will emerge in more detail upon reading the description given hereinafter, with reference to the appended drawings, given only as illustrative and non-limiting examples, wherein.

BETTER WAY FOR CARRYING OUT THE INVENTION

Figure 1:
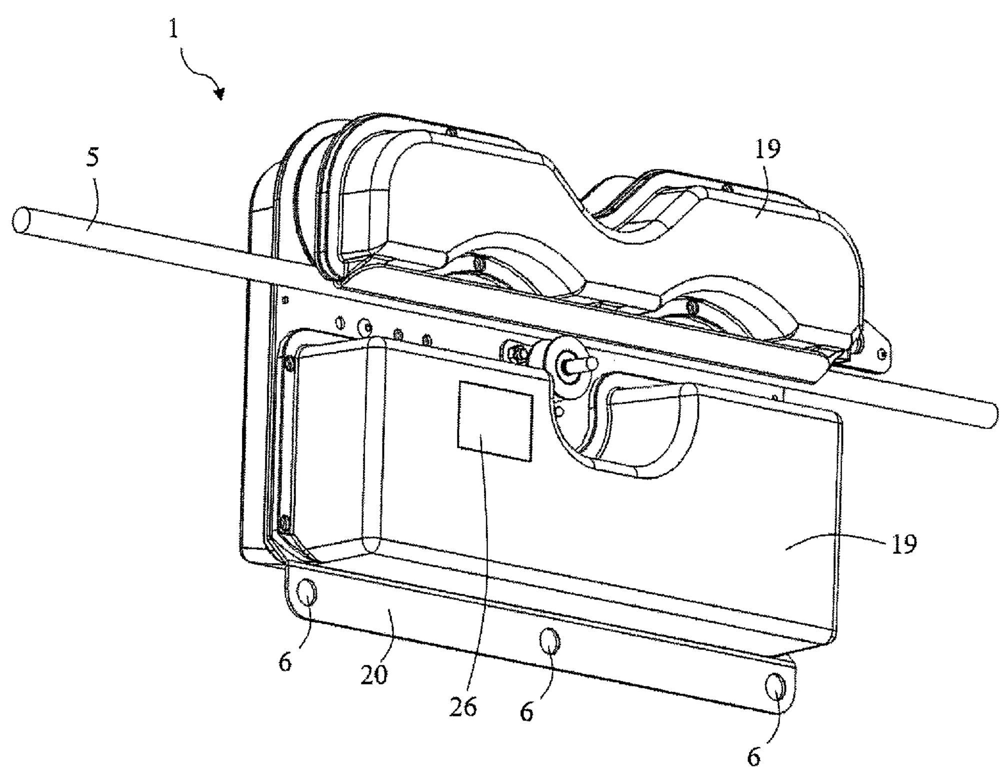
FIG. 1 is a perspective view on the side of an example of a transport device according to the invention, hooked to a guide line.
Figure 2:
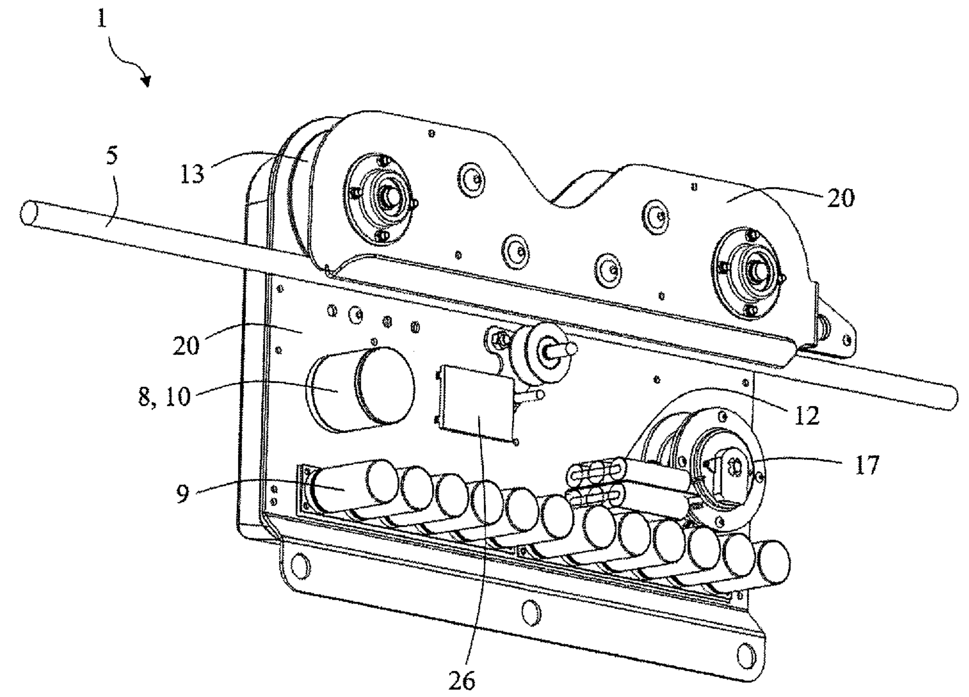
FIG. 2 is a perspective view of the same side of the device of FIG. 1 without some of its covers, to reveal its internal elements.
Figure 3:
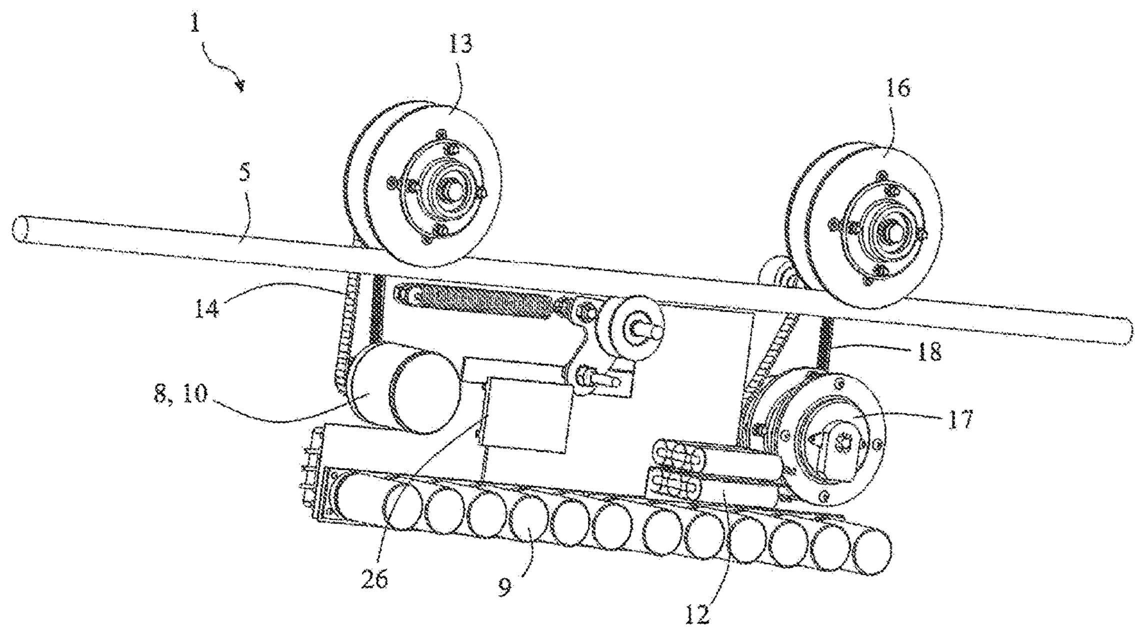
FIG. 3 is a perspective view of the same side of the device of FIGS. 1 and 2 without its external covers and several ones of its internal frame elements.
Figure 4:
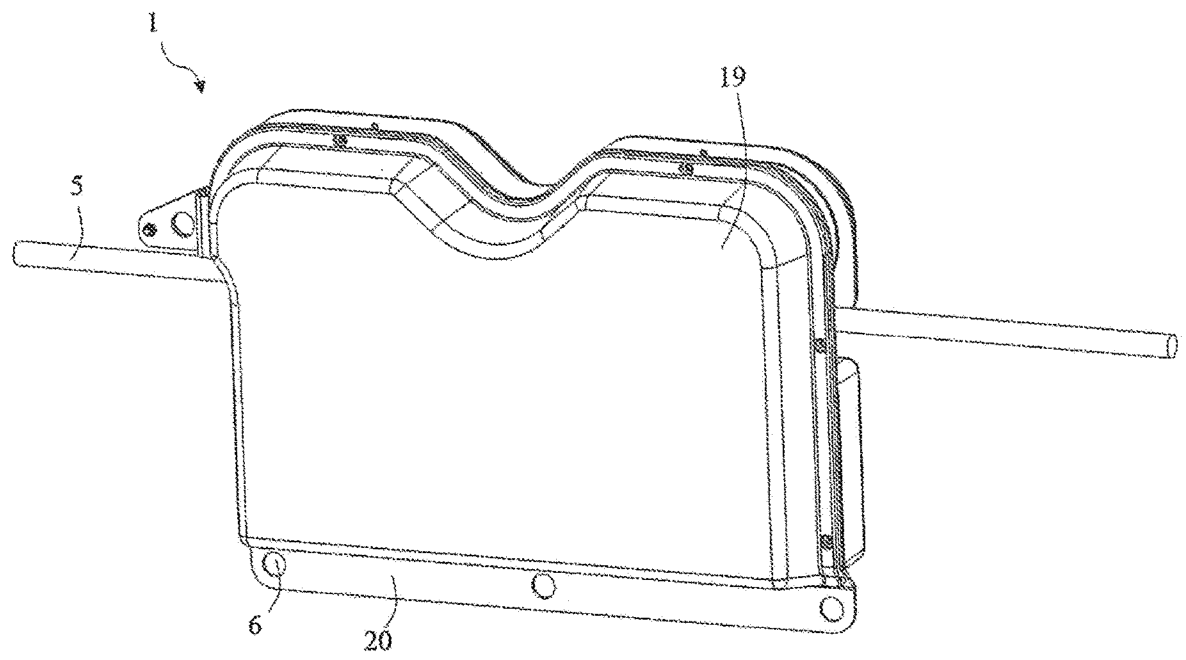
FIG. 4 is a perspective view, from another side, of the transport device of FIGS. 1 to 3, hooked to the guide line.
Figure 5:
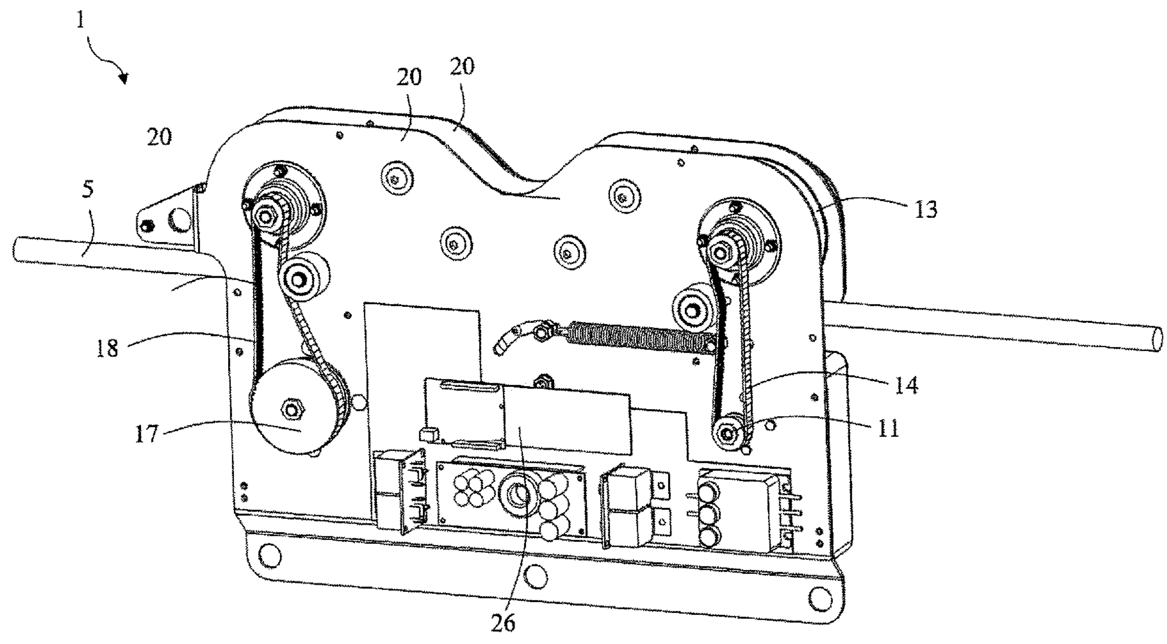
FIG. 5 is a perspective view of the same side of the device of FIG. 4 without some of its covers, to reveal its internal elements.
Figure 6:
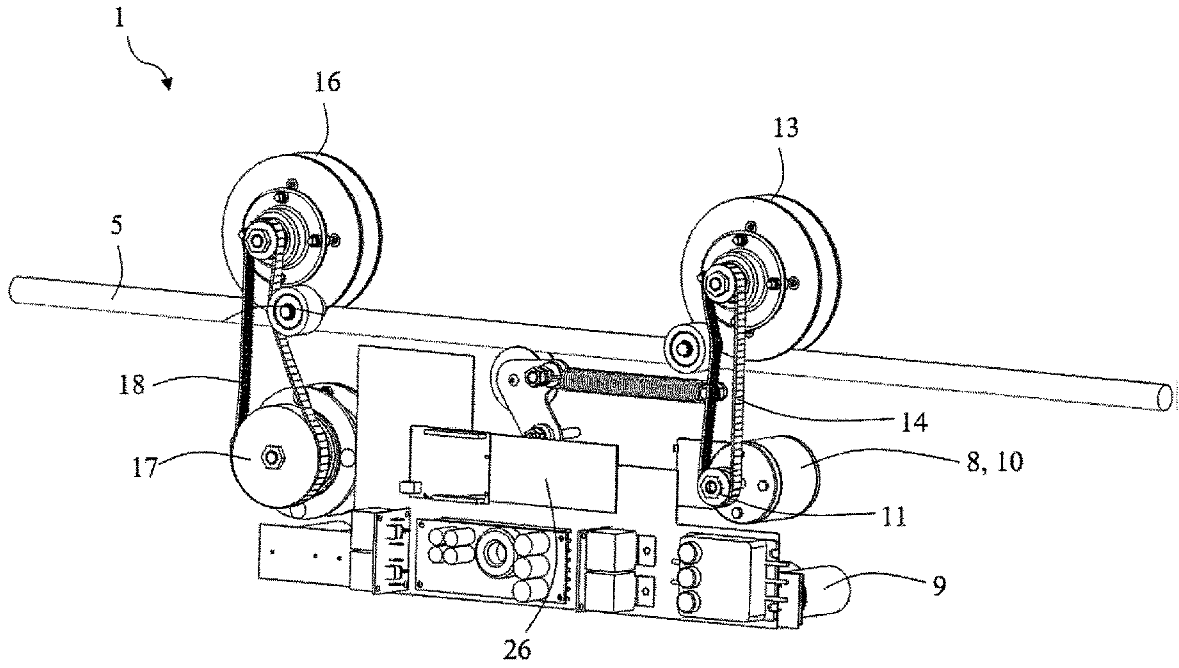
FIG. 6 is a perspective view of the same side of the device of FIGS. 4 and 5 without its covers and several ones of its internal frame elements.
Figure 7:
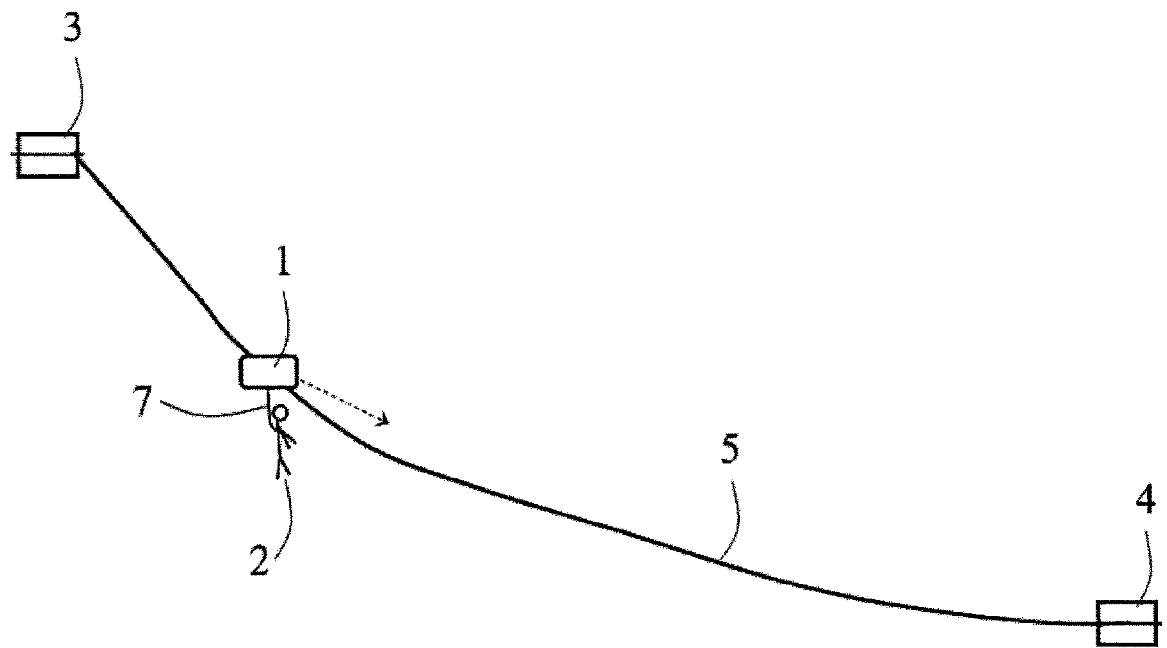
FIG. 7 is a schematic side view of a transport device in accordance with the invention, which descends along a guide line from a first altitude to a second altitude with a load (herein a person) to be transported.
Figure 8:
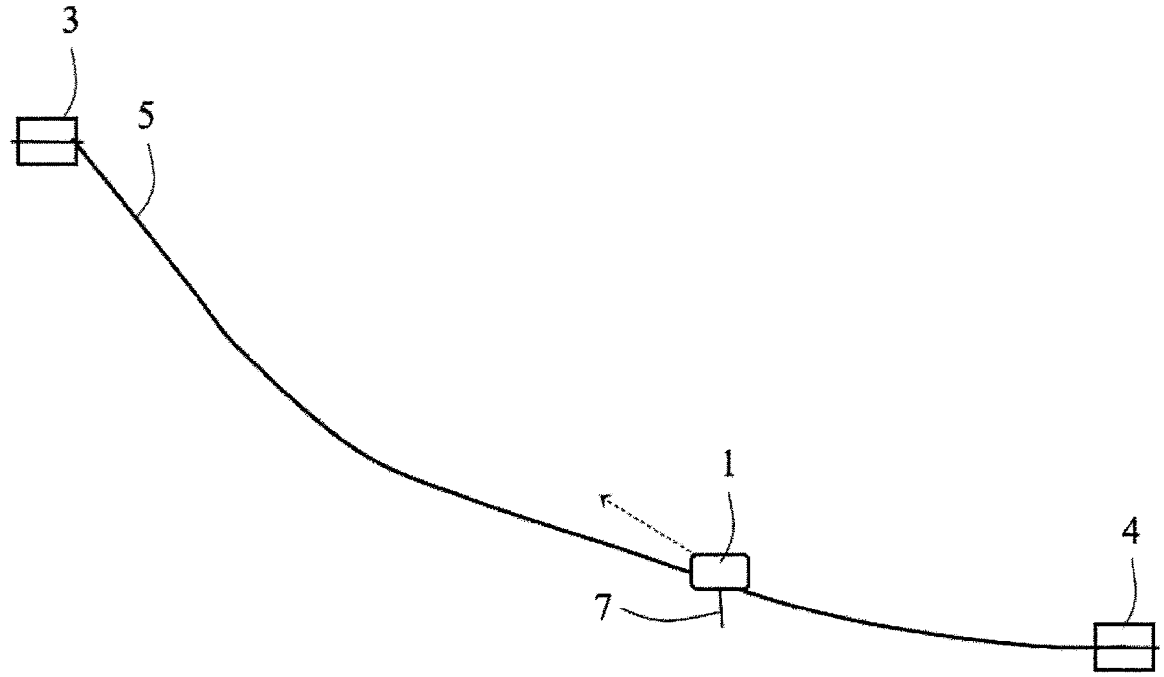
FIG. 8 is a schematic side view of the transport device of FIG. 7, which rises along the guide line from the second altitude to the first altitude, without the load.

As illustrated in the figures, the invention relates, according to a first aspect, to a transport device 1 for transporting a load 2 from a first altitude 3 to a second altitude 4 lower than the first altitude 3 by being hooked to a guide line 5 and descending along the latter by gravity. In other words, the transport device 1 is preferably designed so as to receive said load 2 and transport it by descending from the first altitude 3 to the second altitude 4, the transport device 1 moving, along said guide line 2, at the same time as said load 2 and preferably according to the same movement. In particular, the first altitude 3 corresponds to a first position or area, whereas the second altitude 4 preferably corresponds to a second position or area which is located both below, in the vertical plane, from the first position or area, and at a distance, in the horizontal plane, from the latter. More specifically, said second altitude 4 is advantageously not just below said first altitude 3, but also offset from the latter horizontally. Advantageously, said guide line 5 extends between said first altitude 3 and said second altitude 4, and preferably has an inclination over more than half its length, preferably over more than 80% of its length, more preferably over more than 90% of its length and even the entire length thereof.

According to a first particular embodiment, the guide line 5 is suspended, for example to trees or any other natural or artificial structural element (rocks, masts . . . ) in a sports recreational park. According to a second particular embodiment, the guide line 5 is laid on the ground, for example like a rail. It is also possible to consider a portion of the guide line 5 being laid on the ground, and another portion being suspended.

According to a particular example, preferably in combination with the first particular embodiment hereinabove, the transport device 1 is a zipwire transport device, as illustrated in the figures. Optionally, the transport device 1 may be a turn-by-turn zipwire transport device, or a conventional zipwire transport device (with no turns, long or short, preferably long. Advantageously, said guide line 2 has a length larger than 10 m, preferably larger than 20 m, more preferably larger than 30 m, even more preferably larger than 50 m and possibly larger than 100 m.

In particular, said load 2 is a person, for example a person weighing between 15 and 150 kg. Hence, said load 2 comprises in particular at least one person to be transported from the first altitude 3 to the second altitude 4 by gravity, and more specifically using the own gravity of said person.

More generally, the transport device 1 is preferably designed so as to support the weight of said load 2 so that, when said transport device 1 is hooked to said guide line 5 at the level of said first altitude 3, it is driven downwards and more specifically towards said second altitude 4 in particular thanks to the weight of said load 2, which imparts some kinetic energy to said transport device 1.

According to a variant illustrated in the figures, said transport device 1 is designed so as to transport said load 2 so that the latter is suspended therefrom, in particular below the latter. For example, said transport device 1 comprises one or several attachment point(s) designed so as to receive a means 7 for attaching the load 2 to said transport device 1. In the example illustrated in the figures, each attachment point 6 is formed by a respective orifice provided at a lower portion of the transport device 1.

According to one variant, said guide line 2 is flexible, and comprises for example a rope or a cord, as illustrated in the figures. In other words, according to this last example, said guide line 2 does not have its own mechanical strength.

According to another variant, said guide line 2 is rigid, and comprises for example a rail or a tube. Thus, according to this last example, said guide line 2 has its own mechanical strength. Such a configuration is for example suitable when the transport device 1 is a turn-by-turn zipwire device, but not only.

According to the invention, said transport device 1 comprises at least:

- an electric motor 8, designed so as to at least lift the transport device 1 from the second altitude 4 to the first altitude 3, along said guide line 2, and
- a first battery 9, designed so as to power said electric motor 8.

Preferably, said electric motor 8 and said first battery 9 are sized so as to be able to lift the transport device 1 along said guide line 5 from said second altitude 4 to said first altitude 3 only without said load 2. Thus, the electric motor 8 in particular, is preferably not designed, and for example not powerful enough, to lift the transport device 1 along the guide line 5 when the transport device 1 supports said load 2. Such a configuration allows implementing an electric motor 8 and a first battery 9 that are lightweight and have reduced dimensions. As is know, said first battery 9 is advantageously designed so as to store electrical energy.

Thus, the electric motor 8 advantageously allows moving the transport device 1 along the guide line 2, from the second altitude 4 (or possibly another intermediate altitude lower than the first altitude 3), to and more advantageously up to the first altitude 3. Such a configuration enables the transport device 1 to be set back into position for a new descent without resorting neither to the detachment of the latter and of the guide line 1 nor to a return line to perform the normal lift of the device for moving the second altitude 4 to the first altitude 3.

Preferably, in the present description, the descent of the transport device 1 refers to the movement of the latter from the first altitude 3 to the second altitude 4, the transport device 1 preferably supporting said load 2 during said movement, whereas the lift or lifting of the transport device 1 refers to the movement of the latter from the second altitude 4 towards the first altitude 3, the transport device 1 preferably being empty, that is to say without said load 2 during said movement.

Advantageously, the transport device 1 comprises one or several cover(s) 19. In particular, each cover 19 forms an external portion of the transport device 1 allowing protecting or hiding internal elements of the transport device 1, for example the motor 8, and as will be seen hereinafter, the electric generator 10, the first transmission belt 14, etc.

Moreover, the transport device 1 preferably comprises one or several frame element(s) 20. In particular, each frame element 20 forms an internal portion of the transport device 1 supporting one or several internal element(s) of the transport device 1, for example the motor 8, and as will be seen hereinafter, the electric generator 10, the first transmission belt 14, etc. In the example illustrated in the figures, said frame elements 20 consist of plates, for example made of metal. Advantageously, said frame elements 20 are hidden (at least for more than 50%) by the covers 19, and these are preferably fastened to said frame elements 20.

In accordance with the invention, the transport device further comprises at least one electric generator 10 comprising a rotating portion 11. Thus, according to the invention, said electric generator 10 is designed so as to recharge said first battery 9 when said rotating portion 11 is rotated under the effect of the descent of the transport device 1 from the first altitude 3 towards the second altitude 4. In other words, said rotating portion 11 is advantageously designed so as to be rotated under the effect of the descent of the transport device from the first altitude 3 to the second altitude 4. In this way, it is possible to at least partially recharge said first battery 9 when said transport device 1 descends along the guide line 5, taking advantage of the fact that said load 2 drives the transport device 1 by gravity downwards towards the second altitude 4, thereby producing some kinetic energy. Hence, the transport device 1 is advantageously designed so as to recover at least part of the potential energy lost when it passes, loaded with said load 2, from the first altitude 3 to the second altitude 4, and to supply this recovered energy to said generator 10 so that it produces electrical energy. Hence, the transport device 1 is advantageously designed so as to autonomously rise from the second altitude 4 to (and preferably up to) the first altitude 3, preferably with at least part of the energy recovered during its descent.

Preferably, the transport device 1 is designed so as to recover kinetic energy when it descends along said guide line 5 from the first altitude 3 to the second altitude 4, in order to rotate said rotating portion 11, and thus transform said kinetic energy into electrical energy to recharge the first battery 9. Advantageously, said kinetic energy is at least partially generated by gravity using the weight of said load 2, and to a lesser extent using the weight of the transport device 1, during the descent of the transport device 1.

Preferably, said first battery 9 comprises at least one supercapacitor. Indeed, charging the first battery 9 by the electric generator 10 is generally very fast and intense, and requires a particularly large loading capacity over short durations, in substance the time of the descent of the transport device 1 from the first altitude 3 to the second altitude 4, which often lasts a few seconds to a few tens of seconds, and possibly a few minutes. A supercapacitor usually has higher power and energy densities than conventional batteries, for example lithium-ion batteries.

In general, the transport device 1 is preferably designed so as to apply a braking force opposing its descent along the guide line 5, the application of this braking force allowing recovering kinetic energy in order to convert it into electrical energy by the electric generator 10.

Figure 9:
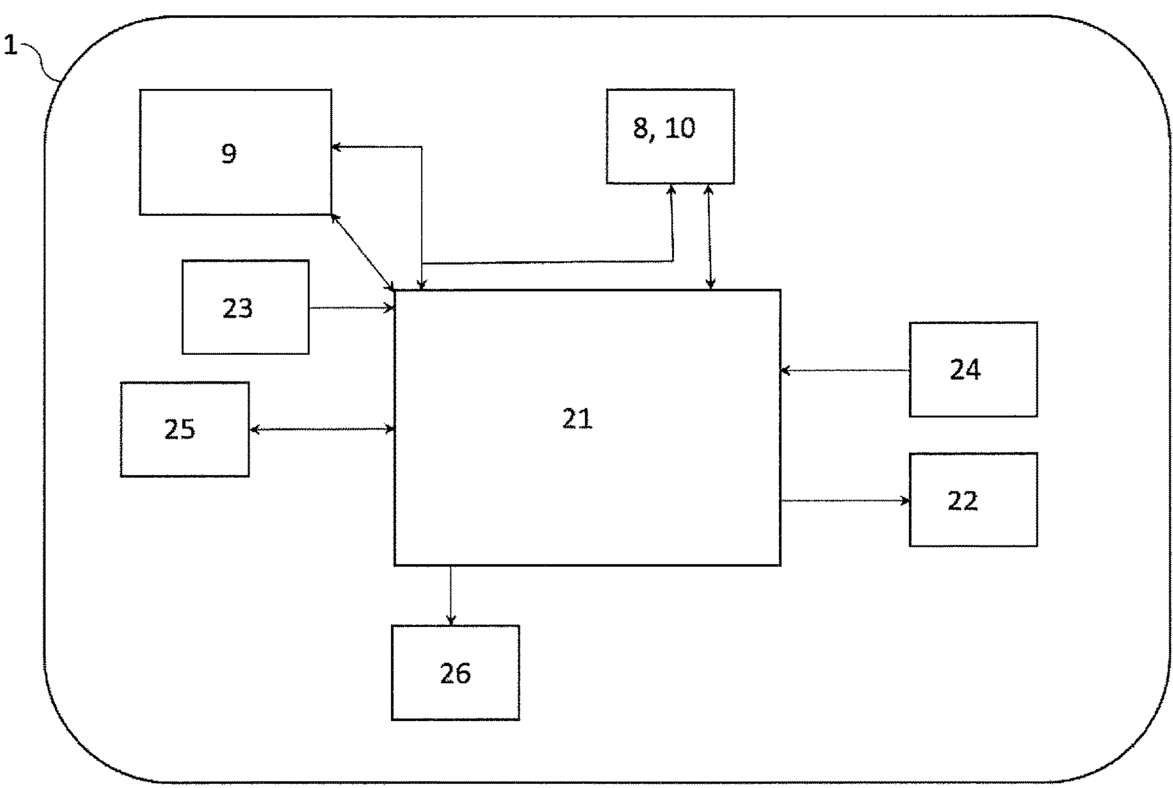
FIG. 9 is a functional block diagram of a variant of the transport device of FIG. 1, with the electronic management means at its center.

According to the invention, the transport device 1 further comprises at least one electronic management means 21, not visible in FIGS. 1 to 8, but a block diagram of which is illustrated just as a non-limiting illustration in FIG. 9. For example, said electronic management means 21 comprises an electronic board. In accordance with the invention, said electronic management means 21 is configured on the one hand to detect a charge level of said first battery 9, and on the other hand to cause an emission of a leakage current by said first battery 9 when said electronic management means 21 detects that the charge level of said first battery 9 exceeds a predetermined charging threshold value. Thus, said electronic management means 21 is advantageously designed so as to determine the charge level of said first battery 9, that is to say the electrical energy which is still accumulated within the latter. Preferably, said electronic management means 21 also allows causing the emission, by said first battery 9 and outside the latter, of the leakage current when it determines that said first battery 9 is charged beyond said charging threshold value. Hence, said electronic management means is advantageously configured to cause the discharge, preferably partial, of said first battery 9, when the latter is excessively charged. Indeed, when said first battery 9 is charged beyond a given threshold, in particular when it is charged at 100% or in the vicinity of 100% (for example between 95% and 100%), there is a risk of seeing said first battery 9 be damaged when said electric generator 10 charges said first battery 9, that is to say when said rotating portion 11 is rotated under the effect of the descent of the transport device 1 from the first altitude 3 to the second altitude 4. In other words, the leakage current advantageously allows avoiding the overflow of electrical energy supplied to said first battery 9 by said generator 10 during the descent of the transport device 1 degrading said first battery 9, the latter having a tendency to deteriorate when it receives a strong electric current while being already completely or almost completely charged. Hence, it preferable to keep said first battery 9 slightly discharged in order to avoid deterioration thereof, which is permitted by the leakage current triggered by the electronic management means 21.

According to the invention, the transport device 1 comprises at least one current receiving means 22, designed so as to absorb said leakage current originating from said first battery 9. Said current receiving means 22 preferably comprises at least one resistance 22, but it can alternatively or in combination comprise at least one other element capable of receiving electrical energy (preferably at high intensity). For example, said current receiving means 22 comprises at least one supercapacitor (not illustrated). Preferably, the latter is dimensioned in a suitable manner so as not to cause a considerable extra cost (it should be quite small), and could receive electrical energy even when it is loaded at 100%, since the degradation thereof is not very important. When said current receiving means 22 comprises a supercapacitor, the latter thus advantageously serves as a "buffer" in which the leakage current (and therefore the surplus generated energy) is emptied, to protect said first battery 9. When said current receiving means 22 comprises a resistance 22, the latter is preferably designed so as to transform said leakage current (which consists in substance of electrical energy) into thermal energy, that is to say that said resistance 22 is preferably designed so as to receive said leakage current and to heat accordingly. Afterwards, the heat produced by said resistance 22 is advantageously dissipated in the surrounding air. Hence, said electronic management means 21 allows advantageously controlling sending of the leakage current from the first battery 9 to said resistance 22 as soon as it detects that said first battery 9 is charged beyond the predetermined charging threshold value, which may for example be 90% or 95%. In other words, the electronic management means 21 is preferably designed so as to control the partial discharge, via said leakage current, of said first battery 9 in said current receiving means 22, when said predetermined charging threshold value of said first battery 9 is exceeded.

Advantageously, said electronic management means 21 is designed so as to cause the emission of the leakage current, by said first battery 9 when it exceeds a predetermined charging threshold value, only when said rotating portion 11 is rotated, and preferably only when said rotating portion 11 is rotated under the effect of the descent of the transport device 1 from the first altitude 3 to the second altitude 4 along said guide line 5.

Thus, said electronic management means 21 is advantageously designed so as to cause the dissipation (intentional) of part of the electrical energy accumulated by said first battery 9 in said current receiving means 22 (therefore heating said resistance 22 for example) during the descent of the transport device 1 along the guide line 5 from the first altitude 3 to the second altitude 4, that is to say while said rotating portion 11 is rotated and said electric generator 10 recharges said first battery 9. Hence, said transport device 1 is preferably designed so as to discharge (via said current receiving means 22) and charge (via said electric generator 10) said first battery 9 at the same time during its descent, so as to avoid the latter being overloaded and therefore undergoing a degradation.

Advantageously, said transport device 1 further comprises a heat exchanger (not illustrated) connected to said resistance 22 to cool the latter. Preferably, said heat exchanger is designed so as to cool said thermal resistance 22 by moving air during the descent of the guide device 1 from the first altitude 3 to said second altitude 4 along said guide line 5. This facilitates the dissipation of the heat of the resistor by taking advantage of the speed of the transport device 1 along the guide line 5 induced by the weight of said load 2 on board said transport device 1.

Said electronic management means 21 may be designed so as to cause the emission of said leakage current intermittently or continuously, in order to achieve an optimum heat evacuation level (in particular thanks to said heat exchanger).

According to a particular embodiment, the transport device 1 further comprises a second battery 12 distinct from the first battery 9 and having a slower rate of charge than the latter. Said second battery 12 is also designed so as to power said electric motor 8, in particular when said first battery 9 is discharged. Thus, said second battery 12 advantageously enables the electric motor 8 to complete the travel of the transport device 1, when the latter lifts the guide line 5 from the first altitude 3 to the second altitude 4, in the case where said first battery 9 is discharged and can therefore no longer power said electric motor 8. Optionally, the second battery 12 is designed so as to at least partially charge said first battery 9, and/or to absorb any excess electrical energy from the electric generator 10 and which cannot be recovered by said first battery 9. For example, said second battery 12 is a lithium-ion battery.

According to a first particular variant of the invention, illustrated in the figures, said electric motor 8 and said electric generator 10 are combinate. For example, said rotating portion 11 forms the shaft of the motor 8, or is secured to the latter. According to a second particular variant of the invention, said electric motor 8 and said electric generator 10 are distinct.

According to a particular embodiment, preferably related to the above-mentioned first variant, said rotating portion 11 also forms part of the motor 8 and is therefore reversible. Thus, according to this last embodiment, said rotating portion 11 advantageously forms part of both the motor 8 and the generator 10. Hence, said rotating portion 11 is preferably designed so as to rotate in two opposite directions of rotation, one enabling the generation of electricity via said generator 10 (which preferably also forms the motor 8) when the device transport 1 descends along the guide line 5 (provided with said load 2), the other enabling the actuation of the motor 8 (which preferably also forms the generator 10) when the transport device 1 rises along the line of guiding 5 (empty, without said load 2). For example, the electric motor 8 is a dynamo (or direct-current generator).

According to a particular embodiment, illustrated in the figures, the transport device 1 comprises at least one first rolling roller 13 designed so as to roll along the guide line 5, said first rolling roller 13 being connected to said rotating portion 11 in order to drive it in rotation according to a first direction of rotation, during the descent of the transport device 1 from the first altitude 3 to the second altitude 4. Thus, in particular when said rotating portion 11 forms part of the motor 8 and is reversible, said motor 8 is designed so as to rotate said rotating portion 11 in a second direction of rotation when it operates, said second direction of rotation preferably being opposite to the first direction of rotation. Hence, said rotating portion 11 is connected to said first rolling roller 13 in order to drive it in rotation, thereby causing the rise of the transport device 1 from the second altitude 4 to the first altitude 3. Preferably, in the first direction of rotation (therefore of the rotating portion 11), the transport device 1 descends along the guide line 5 and stores electrical energy in the first battery 9, and in the second direction of rotation, the transport device 1 rises along the guide line 5 and expends electrical energy derived from the first battery 9 and/or from the second battery 12. For example, said first rolling roller 13 is designed so as to roll on the guide line 5.

For example, the transport device comprises a first transmission belt 14 connecting said rotating portion 11 and said first rolling roller 13. In particular, said first belt 14 allows transmitting the rotational movement of the rotating portion 11 to the first rolling roller 13 during the rise of the transport device 1 along the guide line from the second altitude 4 to the first altitude 3, and the rotational movement of the first rolling roller 13 to the rotating portion 11 during the descent of the transport device 1 along the guide line 5 from the first altitude 3 to the second altitude 4. According to another alternative, the transmission belt 14 may be replaced by a gear; the transport device 1 then comprises one or several gear(s) connecting said rotating portion 11 and said first rolling roller 13.

Advantageously, the transport device 1 comprises a braking means 17, 18, preferably distinct from the motor 8 and from the generator 10, designed so as to limit the maximum speed of the transport device 1 when the latter descends from the first altitude 3 to the second altitude 4 along the guide line 4. Said braking means 17, 18 allows conferring optimum safety on the transport device 1 and especially on the load transported by the latter.

According to one variant, the transport device 1 comprises at least one second rolling roller 16 designed so as to roll along the guide line 5. Preferably, said second rolling roller 16 is distinct from said first rolling roller 13, and at a distance from the latter.

According to a particular embodiment, said braking means 17, 18 is connected to said second rolling roller 16 to limit its rotational speed, during the descent of the transport device 1 from the first altitude 3 to the second altitude 4. For example, said braking means 17, 18 comprises a rotary brake 17 and a second transmission belt 18, which connects said rotary brake 17 and said second rolling wheel 16. Advantageously, the braking means 17, 18 is designed so as to limit the rotational speed of the second rolling roller 16 at a predetermined rotational speed.

Alternatively or in combination with the foregoing, said generator 10 and said braking means 17, 18 are, according to a particular variant of the invention, at least partially combinate. Thus, said generator 10 is advantageously designed so as to be able to operate in regenerative braking in order to recover braking mechanical energy and convert it into braking electrical energy. Of course, said generator 10 is preferably designed so as to be able to operate in regenerative braking at least during the descent of the transport device 1 from the first altitude 3 to the second altitude 4. Advantageously, said electronic management means 21 is configured to be able to direct said braking electrical energy to said first battery 9, to said current receiving means 22, or to both said first battery 9 and said current receiving means 22. When said electronic management means 21 is configured to direct said braking electrical energy to at least said first battery 9, it allows recharging the latter at least partially. When said electronic management means 21 is configured to direct said braking electrical energy to at least said current receiving means 22, it allows avoiding recharging or excessively recharging said first battery 9 (which could damage the latter), by transforming for example at least part of the braking electrical energy into heat via said resistance 22 (thereby constituting at least part of the current receiving means 22). When said electronic management means 21 is configured to direct said braking electrical energy to both said first battery 9 and said current receiving means 22, it allows increasing the torque available for braking of the transport device 1, the generator 10 being able to produce a current higher than the current that the first battery 9 can normally receive since said current receiving means 22 absorbs excess current originating from said generator 10 (the resistance 2 dissipates in particular the excess current, that is to say the leakage current, into heat). Indeed, in general, the higher the braking torque, the more braking electrical energy is recovered (that is to say produced by the generator 10).

According to a particular embodiment, not illustrated in the figures, the transport device 1 comprises at least one propeller connected to a shaft, said propeller and said shaft being designed so as to rotate about the same axis of rotation when the transport device 1 descends along the guide line 5, said shaft being connected to said rotating portion 11 in order to drive it in rotation according to a first direction of rotation, during the descent of the transport device 1 from the first altitude 3 to the second altitude 4. Moreover, the rotating portion 11 is advantageously connected to said first roller 13 in order to drive it in rotation, thereby causing the rise of the transport device 1 from the second altitude 4 to the first altitude 3. Advantageously, the rise is advantageously done so that the propeller does not significantly oppose the movement of the transport device 1, for example the rise is done at a lower speed than the descent.

Advantageously, the transport device 1 comprises a spatial detection means 23, 24 (not illustrated) designed so as to determine the position, the movement, the speed, and/or the acceleration of the transport device 1 along said guide line 5. Optionally, said spatial detection means 23, 24 is calibrated. Advantageously, said spatial detection means 23, 24 comprises at least one satellite geolocation system 23 such as a GPS (Global Positioning System—or alternatively a Galileo system), an optical reader 24, a tachometer, an accelerometer, an inclinometer, a revolution counter, a dynamometer, a gyrometer, and/or a gyroscope. Optionally, the transport device 1 comprises a speed control means designed so as to modify the speed by lifting the transport device 1 on the basis of information derived from the spatial detection means 23, 24. Advantageously, said speed control means is combined with the electronic management means 21, that is to say the latter is designed so as to control the speed, and advantageously the direction of movement (when rising or when descending), of the transport device 21 along said guide line 5. According to a particular embodiment, said spatial detection means 23, 24 is designed so as to determine the position, the movement, the speed, and/or the acceleration of the transport device 1 along said guide line 5 using data originating from the outside of said transport device 1. In other words, according to the latter embodiment, said spatial detection means 23, 24 is designed so as to sample data derived from the external environment of the transport device 1 rather than data derived from the device transport 1 itself (like for example the number of turns of the first roller 13). According to a particular variant, the spatial detection means 23, 24 comprises at least one satellite geolocation system 23, preferably a GPS (or alternatively a Galileo system) and/or an optical reader 24. The combination of the two systems (optical reader 24 and satellite geolocation system 23) is particularly advantageous and allows giving an accurate positioning of the transport device 1 when it moves along said guide line 5 (whether is rising or descending), as illustrated in FIG. 9.

According to a preferred embodiment, when the spatial detection means 23, 24 comprises at least one optical reader 24, said guide line 5 has a plurality of visual markers arranged along the latter. These visual markers may be constituted for example by sections of said guide line 5 painted in white (the other sections of the guide line 5 therefore having another color, a white section having, as immediate neighbors, two sections of another color). Said optical reader 24 is then designed so as to detect said visual markers (for example, as mentioned, white paint marks) and send a respective visual detection signal for each detected visual marker to the electronic management means 21. Advantageously, this visual detection signal is associated, within said electronic management means 21, with a positioning (preferably pre-recorded) along said guide line 5.

According to a particular embodiment of the invention, the transport device 1 comprises a control unit (not illustrated), for example formed by said electronic management means 21, designed so as to receive information from the spatial detection means 23, 24, and from a predetermined upper threshold value (derived from said information), for example a maximum speed, slow down the rotational speed of the rotating portion 11 when the latter is rotated under the effect of the descent of the transport device 1 from the first altitude 3 to the second altitude 4, thereby braking said transport device 1. Advantageously, the control unit comprises electronic processing means suitable for controlling the rotating portion 11 on the basis of input data originating from sensors or detectors. Such a configuration allows further reinforcing the safety provided by the transport device 1 to said load 2, since they cannot exceed, when descending, said predetermined upper threshold value without, according to the example illustrated in the figures, the generator 10 switching into a "motor" mode and opposing the descent of the transport device 1, for example by blocking or braking said first roller 13 (or said propeller). The control unit and the speed control means may possibly be connected or combinate. Thus, the control unit (and/or said electronic management means 21, the latter advantageously forming said control unit or being coincident with the latter) is preferably connected to the electric motor 8 so as to control, its speed (and therefore possibly braking when the motor 8, advantageously combinate with the generator 10, operates in regenerative braking) and/or its operating direction (said motor 8 preferably being reversible) along said guide line 5. Hence, the control unit (and/or said electronic management means 21) is preferably designed so as to ensure, using the motor 8 and/or said generator 10, a controllable braking function dependent on the speed and/or the positioning of the transport device 1 along the guide line 5, and optionally an activation function of the motor 8 (in the motor mode, that is to say consuming energy) to finish the path (at the level of said second altitude 4 in particular), these functions resulting in a targeting function, ensuring the continuity of the pathway between the starting point and the end point.

Optionally, said control unit is further designed so as to receive information from the spatial detection means 23, 24, and on the basis on a predetermined lower threshold value, for example a position, increasing the rotational speed of the rotating portion 11 when the latter is rotated under the effect of the descent of the transport device 1 from the first altitude 3 to the second altitude 4, thereby increasing the speed of said transport device 1. For example, such a configuration enables the transport device 1 to bring the load 2, such as a person, at the end of its descent along the guide line 5 and in particular at the level of the second altitude 4. In summary, this last optional characteristic enables the transport device 1 to complete the descent. This could be useful in the context of a zipwire transport, the end of the descent being sometimes tedious for some people (light weights, arrival with low slope, low final speed, excessive braking, etc.).

Thanks to the invention, it is advantageously possible to modify and/or regulate the speed of descent under the control of said control unit, for example to compensate for possible factors (headwind, drag . . . ) likely to negatively affect the speed (in the direction of a slow down or on the contrary of an acceleration). Thanks to this descent speed control, the user experience and safety are improved: Indeed, the user is assured to arrive at the point of arrival irrespective of the external conditions, and there is no risk of experiencing excessively high speeds, in particular on arrival.

Advantageously, the transport device 1 further comprises a means for recharging (not illustrated) said first battery 9 (and/or said second battery 12) with an external charging means. The external charging means may simply be a mains socket.

For example, said recharging means comprises at least one onboard socket (male or female) and a cable designed so as to connect said onboard socket to the external charging means, said socket being electrically connected to said first battery 9 (and/or to said second battery 12). Alternatively, said charging means comprises an onboard cable (for example windable) which is designed so as to electrically connect said first battery 9 (and/or said second battery 12) to the external charging means. This allows avoiding said first battery 9 (and/or said second battery 12) being completely discharged when the energy balance of the transport device 1 is negative over a given period, that is to say when the transport device 1 expends more energy to be lifted (therefore empty) along the guide line 5 that energy generated when it descends (by carrying said load 2) along the guide line 5.

According to a particular embodiment, illustrated in particular in FIG. 9, the transport device 1 further comprises a remote control means 25 designed so as to remotely control at least one parameter of said transport device 1, such as the speed, the acceleration, and/or a direction of movement (descent, from said first altitude 3 to said second altitude 4, or vice versa, from said second altitude 4 to said first altitude 3) of said transport device 1 along said guide line 5. For example, said remote control means 25 comprises an antenna 25 (preferably external), and preferably further a remote control (not illustrated) designed so as to be connected by a wireless link (for example a radio link) to said antenna 25. Of course, said remote control is advantageously distinct from the rest of the transport device 1, unlike said antenna 25 (which is therefore "onboard"). Advantageously, said antenna 25 is connected to the electronic management means 21, which therefore advantageously allows implementing a remote control of the parameter of the transport device 1, such as the speed, the acceleration, and/or the direction of evolution of the transport device 1 along the guide line 5 Independently or in combination with the foregoing, the transport device 1 may further comprise a display screen 26 connected to said electronic management means 21 and designed so as to display at least one state parameter of said transport device 1. Said state parameter comprises for example a charge level of said first battery 9 (and/or of said second battery 12), a wear index, a temperature (for example the temperature of said resistance 22), etc. When the state parameter comprises a charge level of said first battery 9, this allows determining whether and when it is necessary to recharge the latter, preferably using said recharging means, for example on a mains socket.

The invention further relates, according to a second aspect, to a transport assembly comprising, on the one hand, a guide line 5 and, on the other hand, a transport device 1 for transporting a load 2 from a first altitude 3 to a second altitude 4 lower than the first altitude 3 by being hooked to said guide line 5 and by descending along the latter by gravity, said transport device 1 being in accordance with what is described hereinabove and hereinafter.

The invention further relates, according to a third aspect, to a transport method comprising a step of transporting a load from a first altitude 3 to a second altitude 4 lower than the first altitude 3 by a transport device 1, during which the transport device 1 is hooked to a guide line 5 and descends along the latter by gravity. Preferably, said transport device 1 is in accordance with what is described hereinabove and hereinbelow. Preferably, the transport method is implemented using the transport device 1 (and even the transport assembly) described before. Thus, preferably, the preceding description relating to the transport device therefore also applies to the transport method of the invention, and vice versa.

The method further comprises at least:

- a step of generating electricity, during which a rotating portion 11 of an electric generator 10 of the transport device 1 is rotated under the effect of the descent of the transport device 1 from the first altitude 3 to the second altitude 4,
- a step of recharging a first battery 9 of the transport device 1 thanks to the electricity generated during said generation step,
- a step of lifting the transport device 1 from the second altitude 4 to the first altitude 3, along said guide line 5, thanks to an electric motor 8 powered at least by said first battery 9,
- a detection step, during which it is detected that the charge level of said first battery 9 exceeds a predetermined charging threshold value,
- a step of emitting, by said first battery 9, a leakage current,
- a step of absorbing, by a current reception means 22, said leakage current originating from said first battery 9.

Advantageously, the transport method comprises a spatial detection step during which the position, the movement, the speed, and/or the acceleration of the transport device 1 along said guide line 5 is determined, preferably carried out using the spatial detection means 23, 24. Preferably, said spatial detection step is carried out using said spatial detection means 23, 24. According to a particular embodiment of the invention, the transport method comprises a control step during which information derived from the spatial detection step is transferred, and on the basis of a predetermined upper threshold value (derived from said information), for example a maximum speed, slow down the rotational speed of the rotating portion 11 when the latter is rotated under the effect of the descent of the transport device 1 from the first altitude 3 to the second altitude 4, thereby braking said transport device 1. Preferably, said control step is carried out using said control unit (and/or said electronic management means 21).

According to a particular aspect of the invention, the latter may relate to a transport device 1 for transporting a load 2 from a first altitude 3 to a second altitude 4 lower than the first altitude 3 by being hooked to a line of guiding 5 and descending along the latter by gravity, said transport device 1 being a zipwire transport device 1, said device 1 being characterized in that it comprises:

- an electric motor 8, designed so as to at least lift the transport device 1 from the second altitude 4 to the first altitude 3, along said guide line 5,
- a first battery 9, designed so as to power said electric motor 8,
- an electric generator 10 comprising a rotating portion 11, said electric generator 10 being designed so as to recharge said first battery 9 when said rotating portion 11 is rotated under the effect of the descent of the device transport 1 from the first altitude 3 to the second altitude 4,

- a spatial detection means 23, 24 designed so as to determine the position, the displacement, the speed, and/or the acceleration of the transport device 1 along said guide line 5,
- an electric motor 8, designed so as to at least lift the transport device 1 from the second altitude 4 to the first altitude 3, along said guide line 5,
- a first battery 9, designed so as to power said electric motor 8,
- an electric generator 10 comprising a rotating portion 11, said electric generator 10 being designed so as to recharge said first battery 9 when said rotating portion 11 is rotated under the effect of the descent of the transport device 1 from the first altitude 3 to the second altitude 4.

Preferably, said transport device 1 is, at least for the common elements, such as that one described before.

According to another aspect, preferably associated with the particular aspect of the invention described hereinabove, the invention may further relate to a transport method comprising a step of transporting a load 2 from a first altitude 3 to a second altitude 4 lower than the first altitude 3 by a transport device 1, during which the transport device 1 is hooked to a guide line 5 and descends along the latter by gravity, said transport device 1 being a zipwire transport device 1, the method being characterized in that it further comprises at least:

- a step of generating electricity, during which a rotating portion 11 of an electric generator 10 of the transport device 1 is rotated under the effect of the descent of the transport device 1 from the first altitude 3 to the second altitude 4,
- a step of recharging a first battery 9 of the transport device 1 thanks to the electricity generated during said generation step,
- a step of lifting the transport device 1 from the second altitude 4 to the first altitude 3, along said guide line 5, thanks to an electric motor 8 powered at least by said first battery 9, and
- a spatial detection step during which the position, the movement, the speed, and/or the acceleration of the transport device 1 along said guide line 5 is determined.

Preferably, said transport method is, at least for the common elements, such as that one described before.

Thus, the transport device 1 and the transport method of the invention are particularly suitable for the repeated transport of a load 2, in particular of a person, from a high point to a low point, under optimum safety conditions and in a particularly practical, rapid and energy-efficient manner.

INDUSTRIAL APPLICATION

The invention is particularly suitable for making and implementing energy-efficient zipwire transport devices.

The invention claimed is:

1. A transport device (1) for transporting a load (2) from a first altitude (3) to a second altitude (4) lower than the first altitude (3) by being hooked to a guide line (5) and descending along the latter by gravity, said transport device (1) being characterized in that it comprises:

- an electric motor (8), designed so as to at least lift the transport device (1) from the second altitude (4) to the first altitude (3), along said guide line (5),
- a first battery (9), designed so as to power said electric motor (8),
- an electric generator (10) comprising a rotating portion (11), said electric generator (10) being designed so as to recharge said first battery (9) when said rotating portion (11) is rotated under the effect of the descent of the transport device (1) from the first altitude (3) to the second altitude (4),
- an electronic management means (21), configured on the one hand to detect a charge level of said first battery (9), and on the other hand to cause an emission by said first battery (9) of a leakage current when said electronic management means (21) detects that the charge level of said first battery (9) exceeds a predetermined charging threshold value,
- at least one current receiving means (22), designed so as to absorb said leakage current originating from said first battery (9).

2. The transport device (1) according to claim 1, characterized in that said guide line (5) is flexible, and comprises for example a rope or a cord.

3. The transport device (1) according to claim 1, characterized in that said guide line (5) is rigid, and comprises for example a rail or a tube.

4. The transport device (1) according to claim 1, characterized in that said electric motor (8) and said electric generator (10) are combinate.

5. The transport device (1) according to claim 1, characterized in that said electric motor (8) and said first battery (9) are dimensioned so as to be able to lift the transport device (1) along said guide line (5) from said second altitude (4) to said first altitude (3) only without said load (2).

6. The transport device (1) according to claim 1, characterized in that said load (2) is a person, for example a person weighing between 15 and 150 kg.

7. The transport device (1) according to claim 1, characterized in that it consists of a zipwire transport device (1).

8. The transport device (1) according to claim 1, characterized in that it is designed so as to recover kinetic energy when it descends along said guide line (5) from the first altitude (3) to the second altitude (4), in order to rotate said rotating portion (11), and thus transform said kinetic energy into electrical energy to recharge the first battery (9).

9. The transport device (1) according to claim 1, characterized in that said first battery (9) comprises a supercapacitor.

10. The transport device (1) according to claim 1, characterized in that it further comprises a second battery (12) distinct from the first battery (9) and having a slower charge rate than the latter, said second battery (12) also being designed so as to power said electric motor (8), in particular when said first battery (9) is discharged.

11. The transport device (1) according to claim 10, characterized in that said second battery (12) is a lithium-ion battery.

12. The transport device (1) according to claim 1, characterized in that it comprises at least one first rolling roller (13) designed so as to roll along the guide line (5), said first rolling roller (13) being connected to said rotating portion (11) in order to drive it in rotation according to a first direction of rotation, during the descent of the transport device (1) from the first altitude (3) to the second altitude (4).

13. The transport device (1) according to claim 12, characterized in that said rotating portion (11) further forms part of the motor (8) and is therefore reversible, said motor (8) being designed so as to rotate said rotating portion (11) according to a second direction of rotation when it operates, said second direction of rotation being opposite to the first direction of rotation, said rotating portion (11) being connected to said first rolling roller (13) in order to drive it in rotation, thereby driving the transport device (1) from the second altitude (4) to the first altitude (3).

14. The transport device (1) according to claim 12, characterized in that it comprises a first transmission belt (14) connecting said rotating portion (11) and said first rolling roller (13).

15. The transport device (1) according to claim 1, characterized in that it comprises a braking means (17, 18), preferably distinct from the motor (8) and from the generator (10), designed so as to limit the maximum speed of the transport device (1) when the latter descends from the first altitude (3) to the second altitude (4) along the guide line (5).

16. The transport device (1) according to claim 15, characterized in that it comprises at least one second rolling roller (16) designed so as to roll along the guide line (5), said braking means (17, 18) being connected to said second rolling roller (16) to limit its rotational speed, during the descent of the transport device (1) from the first altitude (3) to the second altitude (4).

17. The transport device (1) according to claim 15, characterized in that said generator (10) and said braking means (17, 18) are at least partially coincident, said generator (10) thus being designed so as to be able to operate in regenerative braking in order to recover braking mechanical energy and convert it into braking electrical energy.

18. The transport device (1) according to claim 17, characterized in that said electronic management means (21) is configured to be able to direct said braking electrical energy to said first battery (9), to said current receiving means (22), or to both said first battery (9) and said current receiving means (22).

19. The transport device (1) according to claim 1, characterized in that it comprises a spatial detection means (23, 24) designed so as to determine the position, the displacement, the speed, and/or the acceleration of the transport device (1) along said guide line (5).

20. The transport device (1) according to claim 19, characterized in that said spatial detection means comprises at least one satellite geolocation system (23) such as a GPS, an optical reader (24), a tachometer, an accelerometer, an inclinometer, a revolution counter, a dynamometer, a gyrometer, and/or a gyroscope.

21. The transport device (1) according to claim 19, characterized in that said spatial detection means (23, 24) is designed so as to determine the position, the displacement, the speed, and/or the acceleration of the transport device (1) along said guide line (5) using data originating from outside said transport device (1).

22. The transport device (1) according to claim 19, characterized in that it comprises a control unit, for example formed by said electronic management means (21), designed so as to receive information from the spatial detection means (23, 24), and based on a predetermined upper threshold value, for example a maximum speed, slow down the rotational speed of the rotating portion (11) when the latter is rotated under the effect of the descent of the transport device (1) from the first altitude (3) to the second altitude (4), thereby braking said transport device (1).

23. The transport device (1) according to claim 22, characterized in that said control unit is further designed so as to receive information from the spatial detection means (23, 24), and on the basis of a predetermined lower threshold value, for example a position, increasing the rotational speed of the rotating portion (11) when the latter is rotated under the effect of the descent of the transport device (1) from the first altitude (3) to the second altitude (4), thereby increasing the speed of said transport device (1).

24. The transport device (1) according to claim 1, characterized in that said current receiving means (22) preferably comprises at least one resistance (22), said transport device (1) further comprising a heat exchanger connected to said resistance (22) to cool the latter.

25. The transport device (1) according to claim 24, characterized in that said heat exchanger is designed so as to cool said thermal resistance (22) by moving air during the descent of the guiding device (1) from the first altitude (3) to said second altitude (4) along said guide line (5).

26. The transport device (1) according to claim 1, characterized in that it further comprises a means for recharging said first battery (9) with an external charging means.

27. The transport assembly comprising, on the one hand, a guide line (5) and, on the other hand, a transport device (1) for transporting a load (2) from a first altitude (3) to a second altitude (4) lower than the first altitude (3) by being hooked to said guide line (5) and descending along the latter by gravity, said transport device (1) being in accordance with claim 1.

28. The transport assembly when the transport device (1) is in accordance with claim 20, characterized in that said guide line (5) has a plurality of visual markers arranged along the latter, said optical reader (24) being designed so as to detect said visual markers and send a respective visual detection signal for each detected visual marker to the electronic management means (21).

29. The transport method comprising a step of transporting a load (2) from a first altitude (3) to a second altitude (4) lower than the first altitude (3) by a transport device (1), during which the transport device (1) is hooked to a guide line (5) and descends along the latter by gravity, the method being characterized in that it further comprises at least:

an electricity generation step, during which a rotating portion (11) of an electric generator (10) of the transport device (1) is rotated under the effect of the descent of the transport device (1) from the first altitude (3) to the second altitude (4), a step of recharging a first battery (9) of the transport device (1) thanks to the electricity generated during said generation step, a step of lifting the transport device (1) from the second altitude (4) to the first altitude (3), along said guide line (5), thanks to an electric motor (8) powered at least by said first battery (9), a detection step, during which it is detected that the charge level of said first battery (9) exceeds a predetermined charging threshold value, a step of emitting, by said first battery (9), a leakage current, a step of absorbing, by a current receiving means (22), said leakage current originating from said first battery (9).

* * * * *